March 29, 1966  S. H. HINE  3,242,806
APPARATUS FOR REDUCING THE SIZE OF A COLLIMATED
BEAM OF RADIANT ENERGY
Filed March 23, 1962
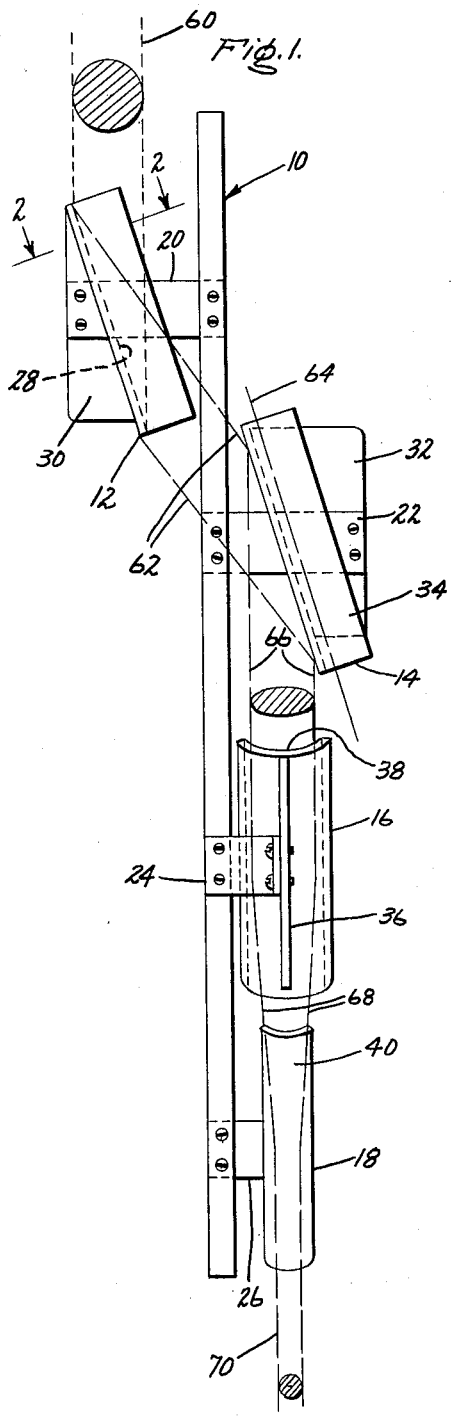
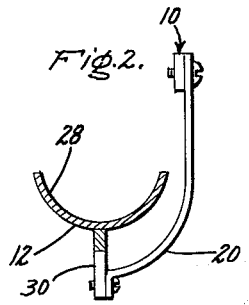
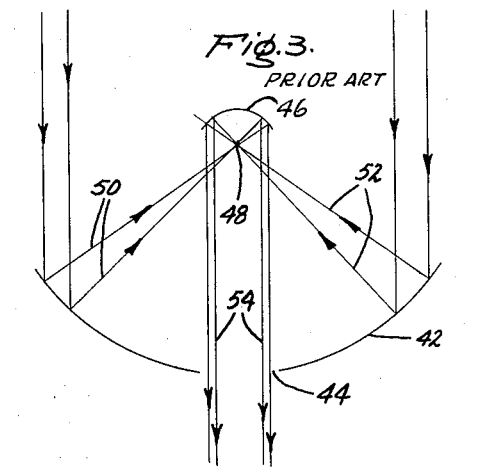
Fig.3.
PRIOR ART
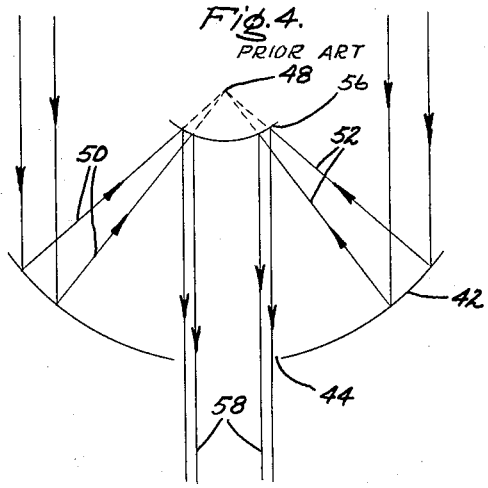
Fig.4.
PRIOR ART
Inventor:
Sheldon H. Hine,
by Hood, Gust & Irish
Attorneys.

United States Patent Office 3,242,806
Patented Mar. 29, 1966

3,242,806
APPARATUS FOR REDUCING THE SIZE OF A COLLIMATED BEAM OF RADIANT ENERGY
Sheldon H. Hine, 3232 Clinton Court, Fort Wayne, Ind.
Filed Mar. 23, 1962, Ser. No. 181,924
4 Claims. (Cl. 88—84)

The present invention relates to an apparatus for reducing the size of a collimated beam of radiant energy, and more particularly to an apparatus employing a unique arrangement of reflective objects whereby the cross-sectional area of a collimated beam may be materially reduced for producing a high intensity beam capable of performing useful work.

It is possible through the use of prior art reflective and refractive optics to reduce the cross-sectional size of a collimated beam; however, these optics are limited in the amount of radiant power which may be controlled and handled. In the use of refractive elements in the reduction of beam size, the size of the exit element must be essentially the same as the reduced beam itself. Thus, at higher power levels, this exit or last-reducing element is subject to severe and damaging heating, thereby sharply limiting the amount of radiant power which can be handled. In the use of known reflective elements for reducing beam size, the actual reduction is limited for similar reasons as in the case of refractive elements. For example, in Cassegrainian type optics, the secondary reflecting element is of such relatively small size that the quantity of radiant power which may be reflected thereby is definitely limited short of that at which this secondary element may be destroyed.

In the present invention, these aforementioned limitations are avoided such that extremely large amounts of radiant power may be handled and controlled. This in general is accomplished through the use of elongated two-dimensional optical elements having relatively large areas over which incident radiant energy may be distributed whereby such areas are subject to cooling and the removal of heat before it reaches damaging proportions.

It is therefore an object of this invention to provide an apparatus for reducing the cross-sectional size of a collimated beam.

It is another object of this invention to provide apparatus for increasing the power density of a beam of radiant energy to a level at which it may be used in the performance of useful work.

It is still another object of this invention to provide an apparatus which utilizes two-dimensional reflective optics for reducing the size or changing the shape of a primary beam of radiant energy.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side elevation of one embodiment of this invention;

FIG. 2 is a sectional illustration taken substantially along section line 2—2 of FIG. 1; and FIGS. 3 and 4 are diagrammatic illustrations of conventional reflective optics, and are used in explaining the operation of this invention.

Referring to the drawings, and more particularly to FIG. 1, a rigid, elongated frame, indicated generally by the reference numeral 10, has fixedly mounted thereon four different reflectors 12, 14, 16 and 18 by means of suitable brackets 20, 22, 24 and 26, respectively. The construction of these four reflectors is generally the same such that a description of one will suffice for all. Directing attention primarily to the reflector 12, therefore, it comprises an elongated, rigid element formed of metal or the like which is straight longitudinally and concave in cross-section as shown in FIG. 2, this element 12 having a highly reflective inner surface 28. A mounting rib or flange 30 of suitable rigid construction is longitudinally secured to the rear side of the reflector 12 as shown by means of welding or the like. The bracket 20 is secured as shown in FIGS. 1 and 2 at its opposite ends to this flange 30 and also to the support 10 for securing the reflector 12 in the illustrated position.

As shown in FIG. 1, the reflector 14, which is constructed generally the same as the reflector 12 and is mounted on the support 10 in the same manner, is positioned on the right-hand side of the frame 10 and longitudinally downwardly from the reflector 12. The mounting flange 32 which is similar to the flange 30 for the reflector 12 is secured to the inner, longitudinal side of the reflector 14 instead of the outer side as is the case for the reflector 12. The bracket 22 extends from this flange to the frame 10, thereby providing support for the reflector 14.

More particularly, the reflector 14 is provided with a curvature much the same as the reflector 12 with the outer surface 34 being convex toward the left, or in other words toward the reflector 12, and highly reflective. For making this surface 34 reflective, it may either be highly polished or provided with a coating of material which is highly reflective. As shown, the two reflectors 12 and 14 are both laterally and longitudinally spaced apart, and further than this they are positioned to be parallel to each other and at an acute angle to the longitudinal extent of the support 10.

Disposed beneath the reflector 14 and in the "reflective optical path" of the latter is the reflector 16 which is provided with a longitudinal mounting flange 36 on the rear, convex side thereof to which is secured the mounting bracket 24. Considering the side of the frame 10 as viewed in FIG. 1 as being the front, this reflector 16 is disposed on the front side of the frame 10 in the same relation thereto as the reflectors 12 and 14 are positioned to the opposite lateral sides thereof. This reflector 16 is also set at an acute angle to the longitudinal extent of the frame 10 the same as are the reflectors 12 and 14, this angle being in a plane normal to the drawing surface.

The inner surface 38 of this reflector 16 is highly reflective, being either polished or provided with a coating of some efficient reflective material.

The reflector 18 is mounted on the frame 10 in a position below the reflector 16 but on the back side of the frame, the convex surface 40 thereof being highly reflective. These two reflectors 16 and 18 are spaced apart to the front and rear, respectively, of the frame 10 and further are longitudinally spaced the same as the two reflectors 12 and 14. In addition to this, the two reflectors 16 and 18 are parallel, such that if the drawing of FIG. 1 were rotated 90°, the two reflectors 16 and 18 would appear in the same relation as the reflectors 12 and 14, and the latter reflectors would appear in the same relation as the two reflectors 16 and 18 appear in the drawing.

Before explaining the operation of the apparatus of FIG. 1, reference is made to FIGS. 3 and 4 wherein certain of the operating principles are illustrated. The apparatuses shown in outline form in these figures may be considered as typical of Cassegrainian optics wherein a bowl-shaped primary reflector 42 having a central aperture 44 is symmetrically disposed opposite a secondary reflector 46. The focal point of the reflector 42 is indicated by the numeral 48. A relatively large collimated beam of light axially directed into the reflector 42 is reflected upwardly and focused onto the focal point 48 as indicated by the rays 50 and 52. These rays are reflected from the secondary reflector 46 which is mounted to the rear of the focal point 48 and are directed backwardly along collimated paths as indicated by the rays 54 through the aperture 44. The two reflectors 42 and 46 are concavely shaped facing each other such that the collimated beam of light which is axially directed onto the reflector 42 will be reduced in size and directed outwardly in the form of the collimated beam 54.

The optics of FIG. 4 are identical to those of FIG. 3 with the exception that the secondary reflecting element 56 is positioned to the front of the focal point 48 of the reflector 42 and is oppositely curved to that of the reflector 46. The incoming rays 50 and 52 are reflected from the two reflectors 48 and 56 the same as in the case of FIG. 3 with the beam as indicated by the rays 58 which are reflected from the reflector 56 being parallel and passing through the aperture 44. Here again, the spacing between the reflectors 42 and 56 as well as the particular curvatures thereof are such that the collimated input beam to the reflector 42 is reduced to the size of the collimated output beam 58 which emergeres from the reflector 56.

It is important to note that reduction of beam size may be achieved through the use of secondary reflectors which may be either on the front or rear sides, respectively, of the focal point 48. Also, in reducing the diameter of the collimated beam, it should be noted that the input beam is focused at a point 48. The relative sizes, shapes and spacing of the primary and secondary reflectors 42, 46, 56 will, of course, determine the diameter of the output beams 54 and 58, the smaller the secondary reflectors, the smaller the output beam.

Inasmuch as the secondary reflectors 46 and 56 receive the total energy of the primary beam fed to the reflector 42, it is seen that if the energy in this beam is sufficiently high, the secondary reflectors 46 and 56 will be heated to such a high temperature that they can be destroyed or damaged. This is due to the reason that the areas of these reflectors 46 and 56 are quite small such that they are incapable of dissipating heat rapidly enough to prevent this damage.

Now considering the operation of the apparatus of FIG. 1, the reflector 12 resembeles reflector 42 of FIG. 4 and the reflector 14 resembles the reflector 56. A collimated light beam 60 which is circular in cross-section is directed downwardly into the reflector 12 against the concave surface 28, the axis of this beam 60 being at an acute angle with respect to the longitudinal extent or dimension of the reflector 12. As shown by the dashed lines in FIG. 1 which outline the beam 60, the beam is spread over the entire curved surface 28 from one end to the other and also from side to side. Entering the reflector at the low incident angle shown, the beam 60 will be reflected along the path indicated by the dashed lines 62 toward and onto the outer convex surface 34 of the reflector 14. This reflected beam 62 is shown as being spread over the entire area of the surface 34 from one end to the other.

The curvature of the reflecting surface 28 is made such that the beam 60 upon being reflected from the surface 28 will be focused onto a straight line as indicated by the dashed line 64 instead of toward a point as is true of the optics of FIGS. 3 and 4. As shown in FIG. 1, this line 64 is disposed to the rear of the reflecting surface 34 and is parallel to the longitudinal extent or dimension thereof. The relationship between this focal line 64 and the reflective surface 34 corresponds to the focal point 48 and the reflective surface 56 in the optics of FIG. 4.

The curvature of the reflective surface 34 as well as the spacing thereof from the reflecting surface 28 and the focal line 64 are made such that the focused beam 62 is reflected from and collimated into a downwardly directed beam 66 which is ellipsoidal in cross-section. The major axis of this beam 66 ellipse is of the same length as the diameter of the beam 60; however, the minor axis of this beam 66 is much smaller than this diameter. The curvatures of the two surfaces 28 and 34 as well as the relative spacing and positioning thereof produce this ellipsoidal beam which is the same as the original collimated beam 60 with the exception that it has been reduced in one dimension. The term "collimative reflective registry," as used in certain of the claims appended hereto, defines and refers to the curvatures of the surfaces 28 and 34, the spacing therebetween and the positional relationship thereof whereby the collimated beam of reduced dimension is obtained. As disclosed, the surfaces 28 and 34 are in "collimative reflective registry," because the collimated beam 66 of reduced dimension results therefrom. Now comparing this result with that achieved by the optics of FIG. 4, it is seen that the bowl-shaped optics of this latter figure reduce the size of the input beam in circular form instead of in a single dimension as is true of the two-dimensional reflectors 12 and 14 of FIG. 1. In this respect, the optics of FIGS. 3 and 4 may be considered as using three-dimensional reflectors as contrasted with reflectors 12 and 14 which may be characterized as two-dimensional reflectors.

The beam 66 is next directed along the "reflective optical path" of the surface 34 into the reflector 16 against the concave reflecting surface 38 at, for example, the same incident angle as the beam 60 enters the reflecting surface 28, this beam 66 being reflected from the surface 38 along the path indicated by the numeral 68 toward a focal line which is situated just to the rear of the convex reflecting surface 40 of the reflector 18. At this point it may be stated that this latter focal line is situated parallel to the longitudinal extent or dimension of the reflecting surface 40. The focused beam 68 is next reflected from the convex surface 40 and thereby collimated into the beam 70 which is of circular cross-section as shown.

The two reflecting surfaces 38 and 40 are in "collomative reflective registry" and compress the major axis of the beam 66 ellipse to the size of the diameter of the beam 70. It will now be recognized that the reflector pairs 12, 14 and 16, 18 are oriented at right angles to each other such that the first pair 12, 14 compresses the beam 60 in one dimension and the other pair 16, 18 compresses the beam in a dimension at right angles thereto. This right angle relationship between the reflector pairs 12, 14 and 16, 18 may be better understood by noting that the reflectors 12, 14 are laterally spaced apart in the plane of the drawing whereas the reflectors 16, 18 are laterally spaced apart in a plane normal to the drawing, the intersection of these two planes defining a line which is parallel to the axes of the two beams 60 and 70.

The reflecting surfaces 38 and 40 are shaped and arranged with respect to each other much the same as the two reflecting surfaces 28 and 34 previously described such that the reflection between the two surfaces 38 and 40 will result in the formation of the final collimated beam 70. At this point, it should be noted that the size of this beam 70 is substantially smaller than the original beam 60.

It may now be observed that the angles at which the various reflectors are positioned, the spacing therebetween, the positioning of the secondary reflectors from the respective focal lines and the sizes of the light beams handled will determine the particular shapes of the reflectors in achieving the desired collimated beam of reduced cross-sectional size. In this respect, the particular shapes and positions of the primary and secondary reflectors, or in other words the "collimative reflective registry" therebetween, must be such that the angles of incidence and reflection will produce an output beam having rays which are parallel to each other.

While the two reflectors 14 and 18 are shown as having the reflective surfaces thereof disposed between the focal lines and the respective primary reflectors 12 and 16, the secondary reflectors 14 and 18 may be reversed in curvature with the reflecting surfaces being disposed on the opposite side of the respective focal lines to that shown in the drawing. Such arrangement would correspond to the Cassegrainian optics of FIG. 3.

The term "reflective optical path," as used in certain of the claims appended hereto, defines and refers to the space occupied by the beam reflected from the surface 34 (or as otherwise explained herein, the functional equivalent of surface 34), this beam in the illustrated embodiment being beam 66. The positional relationship between surfaces 34 and 38 whereby the beam 66 is reflected from the surface 38 onto the surface 40 and formed into the cross-sectional shape indicated by the numeral 70 is referred to in certain of the claims as "extended reflective registry." Thus, with the surface 38 being in the "reflective optical path" of the surface 34 and the two surfaces 34 and 38 being in "extended reflective registry," the beam 66 is compressed into the beam 70.

It will now become apparent that the apparatus of FIG. 1 may be utilized for handling and reducing in size collimated beams of radiant energy of extremely high intensity inasmuch as the incident beam, such as the beam 60, is spread over a substantial reflective area 28 which may be more effectively cooled and thereby prevented from becoming damaged than the smaller reflective area, such as the reflector 42, used in Cassegrainian optics wherein the size of the reflector 42 must be the same as that of the input beam. Still further, the focused beam which is extremely intense over the small area of the secondary reflector 46 of FIG. 3 is, in this invention, spread over a substantially larger area on the secondary reflector 14 of FIG. 1, which area may be more effectively cooled than is possible in the prior art case. Still further, by reason of the low incident angle of the beam which is reflected between the various reflectors 12, 14, 16 and 18, greater reflecting efficiency is obtained with the heating of the reflecting elements being less than would be true if the incident angle were closer to a perpendicular to the reflecting surface. Thus, it is seen that the present invention can handle and control beams of greater power than has heretofore been possible and at the same time produce an output beam of substantially greater intensity than the input beam.

While I have described above the principles of my invention in connection with specific apparatus, it is to be clearly understood that this description is made only by way of example and not as a limitation to the scope of my invention.

What is claimed is:

1. Apparatus for reducing the cross-sectional area of a collimated beam of radiant energy comprising: a first member having an elongated first reflecting surface which is straight longitudinally and concave in cross-section, said first surface being part cylindrical and providing a focal line which is parallel therewith and disposed in front thereof, said first surface having a first axis of curvature, a second member having an elongated second reflecting surface which is straight longitudinally and curved in cross-section, said reflecting surfaces being both laterally and longitudinally spaced apart, said first and second reflecting surfaces also extending in parallel directions, said second reflecting surface being convex in a direction toward said first surface and being disposed adjacent to said focal line, both of said reflecting surfaces further being in collimative reflective registry whereby a collimated beam of light incident on said first surface at a predetermined angle is reflected from said first surface onto said second surface from which it is reflected in collimated form but with one cross-sectional dimension thereof reduced, a third member having an elongated third reflecting surface which is straight longitudinally and concave in cross-section, said third surface having a third axis and a cylindrical shape which provides a second focal line which is parallel therewith and disposed in front thereof, said third surface being disposed in the reflective optical path of said second surface, said second and third surfaces being in extended reflective registry, a fourth member having an elongated fourth reflecting surface which is straight longitudinally and curved in cross-section, said third and fourth reflecting surfaces being parallel and being laterally and longitudinally spaced, said fourth surface being convex in a direction toward said third surface and being disposed adjacent and parallel to the second focal line, the lateral spacing between said third and fourth surfaces being in a direction at right angles to the direction of lateral spacing between said first and second surfaces, both said third and fourth surfaces further being in collimative reflective registry whereby a collimated beam of light reflected along said reflective optical path from said second surface onto said third surface is reflected from the latter onto said fourth surface from which it is reflected in a collimated form but with a second cross-sectional dimension thereof reduced, said second dimension being at right angles to said one dimension, and means fixedly supporting said surfaces in the relative positions aforesaid.

2. Apparatus for reducing the cross-sectional area of a collimated beam of radiant energy comprising: a first elongated reflecting surface which is straight longitudinally and concave in cross-section, said first surface having a first axis and a shape which provides a focal line which is parallel therewith and disposed in front thereof, a second elongated reflecting surface which is straight longitudinally and curved in cross-section, said first and second reflecting surfaces being both laterally and longitudinally spaced, said first and second surfaces also being parallel, said second reflecting surface being disposed adjacent and parallel to said focal line, first means including said first and second surfaces and the shapes and spacing therebetween for receiving a first collimated beam of light and reducing the size thereof in one cross-sectional dimension but maintaining its collimated form, a third elongated reflecting surface which is straight longitudinally and concave in cross-section, said third surface having a third axis and a shape which provides a second focal line which is parallel therewith and disposed in front thereof, a fourth elongated reflecting surface which is straight longitudinally and curved in cross-section, said third and fourth reflecting surfaces being parallel and laterally and longitudinally spaced, said fourth surface being disposed adjacent and parallel to the second focal line, the lateral spacing between said third and fourth surfaces being in a direction at an angle to the direction of lateral spacing between said first and second surfaces, second means including said third and fourth surfaces and the shapes and spacing therebetween for receiving the collimated beam of reduced dimension from said first means and reducing the size thereof in a second cross-sectional dimension at an angle to said first cross-sectional dimension, and means fixedly supporting said surfaces in the relative positions aforesaid.

3. Apparatus for reducing the cross-sectional area of a collimated beam of radiant energy comprising: first means for receiving a first collimated beam and reducing the size of said first beam in one cross-sectional dimension but maintaining its collimated form, said first means having two spaced apart elongated curved reflective surfaces of extended area having axes of curvature, respectively, which are parallel, said curved surfaces being laterally and longitudinally spaced apart whereby one of said surfaces receives said beam of light at a predetermined angle and reflects it onto the other of said surfaces, and second means for receiving said reduced collimated beam and reducing the size thereof in a second cross-sectional dimension, said second means having two spaced apart elongated curved reflective surfaces of extended area having axes of curvature, respectively, which are parallel, the last-mentioned curved surfaces being laterally and longitudinally spaced apart whereby one of said surfaces of said second beams receives said reduced beam of light at a predetermined angle and reflects it onto the other of said surfaces of said second means, said second dimension being at an angle to said one dimension.

4. The apparatus of claim 3 wherein the lateral spacing between said first and second surfaces is in a direction transverse to the direction of lateral spacing between said third and fourth surfaces.

References Cited by the Examiner

UNITED STATES PATENTS

| | | |
|---|---|---|
| 1,395,812 | 11/1921 | Gerber. |
| 2,157,138 | 5/1939 | Mendz _____ 88—57 |
| 2,252,246 | 8/1941 | Bergmans et al. |
| 2,653,249 | 9/1953 | Harker. |
| 2,769,373 | 11/1956 | Bouwers. |
| 2,798,411 | 7/1957 | Coleman _____ 88—57 |
| 2,970,518 | 2/1961 | Ross. |
| 2,995,066 | 8/1961 | Dufresse. |

JEWELL H. PEDERSEN, *Primary Examiner.*

D. J. HOFFMAN, W. L. SIKES, *Assistant Examiners.*